(12) United States Patent
Baker (10) Patent No.: US 7,127,433 B2
(45) Date of Patent: Oct. 24, 2006

(54) METHOD FOR GENERATING PAY-PER-PAGE PRICING DATA FOR MANAGED PRINTER SERVICES

(75) Inventor: Jonathan Baker, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 907 days.

(21) Appl. No.: 09/974,103

(22) Filed: Oct. 11, 2001

(65) Prior Publication Data
US 2003/0115156 A1 Jun. 19, 2003

(51) Int. Cl.
*G06F 17/00* (2006.01)
(52) U.S. Cl. .............................. 705/400; 399/8; 399/79; 358/1.8
(58) Field of Classification Search ................ 705/14; 358/296
See application file for complete search history.

(56) References Cited

U.S. PATENT DOCUMENTS

| | | | | |
|---|---|---|---|---|
| 5,383,129 A | * | 1/1995 | Farrell | 705/400 |
| 5,636,032 A | * | 6/1997 | Springett | 358/296 |
| 6,516,157 B1 | * | 2/2003 | Maruta et al. | 399/8 |
| 6,856,430 B1 | * | 2/2005 | Gase | 358/1.9 |
| 2002/0002492 A1 | * | 1/2002 | Okazawa | 705/14 |
| 2003/0043401 A1 | * | 3/2003 | Abel et al. | 358/1.14 |
| 2003/0046171 A1 | * | 3/2003 | Whale | 705/26 |

FOREIGN PATENT DOCUMENTS

WO WO 99/36835 * 7/1999

OTHER PUBLICATIONS

"HP Endorses Cost-per-page Methodology In Continued Efforts to Protect consumers, IDC Offers standard Method for Evaluating Toner-cartridge Yield and Cost per Page", Sep. 28, 1999, Business Wire.*
"Color in the office: Is your office ready?", Jan./Feb. 1998, Managing Office Technology, vol. 43, Iss. 1; p. 26, 2 pgs.*
"Color in the office: Is your office ready?", Jan./Feb. 1998, Managing Office Technology, vol. 43, Iss 1, p. 36.*

* cited by examiner

*Primary Examiner*—John W. Hayes
*Assistant Examiner*—Freda Nelson (57) ABSTRACT

A method is disclosed for generating pricing data for managed computer printer services for a user of a fleet of computer printer devices over a contract time period including first selecting between two possible pricing models, pay-per-page with minimums or pay-per-page with a fixed periodic payment. Variable costs comprising the costs of toner cartridges and preventative maintenance are computed for both monochromatic and color printers and these respective variables contribute to determine the total costing of both models. In the fixed periodic model the cost of hardware and a service fee also contribute to the final pricing figure. The toner portion of the variable costs element may be determined on the basis of predictions of page coverage for both mono and color printers, but may also be determined from historical averages resulting from actual measurement of the page coverage of printers in the fleet.

11 Claims, 10 Drawing Sheets

METHOD FOR GENERATING PAY-PER-PAGE PRICING DATA FOR MANAGED PRINTER SERVICES

The present invention is a method for generating price quotes for managed print service users that employs a pay-per-page pricing model.

BACKGROUND

Previously used methods of pricing the use of computer printers were less accurate and involved the use of spread sheets and other cumbersome accessories that failed to provide all the pricing information for the various elements of a system such as the hardware, supplies, support and finance. Prior methods required implementation by persons especially skilled in the pricing activity and failed to achieve a high level of cost allocation as to toner, especially in differentiating between monochromatic and color printing installations.

SUMMARY OF THE INVENTION

The method of the present invention allows the creation and definition of a fleet of devices to be managed under a printer services contract. Once a fleet of devices has been defined, a price quote can be generated using the pricing data stored in a database, together with information secured from a potential customer or user of the printer devices under the services contract. Two different pricing models are supported by the method of the present invention. Both are variations of a pay-per-page pricing model where a user's total fee is determined by the number of pages printed on each device in the fleet. A cost per page is established for each printer in a customer's fleet before contract signing. At the end of each pay period, the number of pages printed on each device is determined. The page counts are multiplied by the appropriate cost per page to calculate a customer's bill for that period.

The challenge in establishing a pay-per-page pricing model is ensuring that fixed costs such as hardware or consulting are covered regardless of the volume of printing that takes place. The method of the present invention includes two options to address this issue. The first is a pay-per-page with minimums where a minimum volume of pages is established for each class of printer in the fleet (i.e. all the LaserJet 4050's). Different page costs define the total equation; the first is the cost for each page up to and including the minimum volume. The second page cost is called the overage and is the cost for each page beyond the minimum volume count. Regardless of what the initial cost per page is, the user has to pay that amount multiplied by the minimum page count (which equates to a fixed monthly payment). When this model is selected, the user will be required to input the minimum page volumes for each device they add to the fleet.

The second option is a pay-per-page with a fixed monthly payment arrangement. The variable costs associated with each unit in a fleet are abstracted from the cost per page calculation. These costs are distributed across the term of the user's contract (or given time period) to determine a fixed monthly payment for each device, regardless of the number of pages printed. A cost per page is established for each device type to cover the variable costs (e.g. toner and support). This cost is typically the same as the overage cost in the previous model. When this model is selected, the user will not be required to make use of any minimum page volumes.

The respective pricing model processes are subsequently described in detail in terms of their respective steps. The calculations consist of performing various sub-calculations on each unit in the fleet followed by a summation process. Each unit is typically a printer type with associated accessories, and a quantity, however printers are not the only type of devices to which the methods of the present invention may by applied. The quantity may represent many physical units.

For each item in the new and sale/leaseback lists two pricing elements are calculated, a periodic fee and an overage fee. The periodic fee is a fixed monthly or quarterly fee for each unit. The overage fee is the cost per page for each page printed beyond the minimum number of pages set for each unit. These two cost elements are derived from three sub-calculations performed on each unit: hardware pricing, support pricing and supply pricing.

In addition to these three pricing elements, the method of the invention provides for the insertion of a service fee. This fee is a lump sum that is allocated back across each item of hardware, including new and sale/leaseback units. This can be determined either by dividing the fee equally amongst each unit in the fleet or by varying the allocation according to the cost of a unit. Regardless of the allocation, the result is an addition to the periodic fee for each unit of printer hardware, either new or sale/leaseback.

DETAILED DESCRIPTION OF PREFERRED EMBODIMENT

Figure 1:
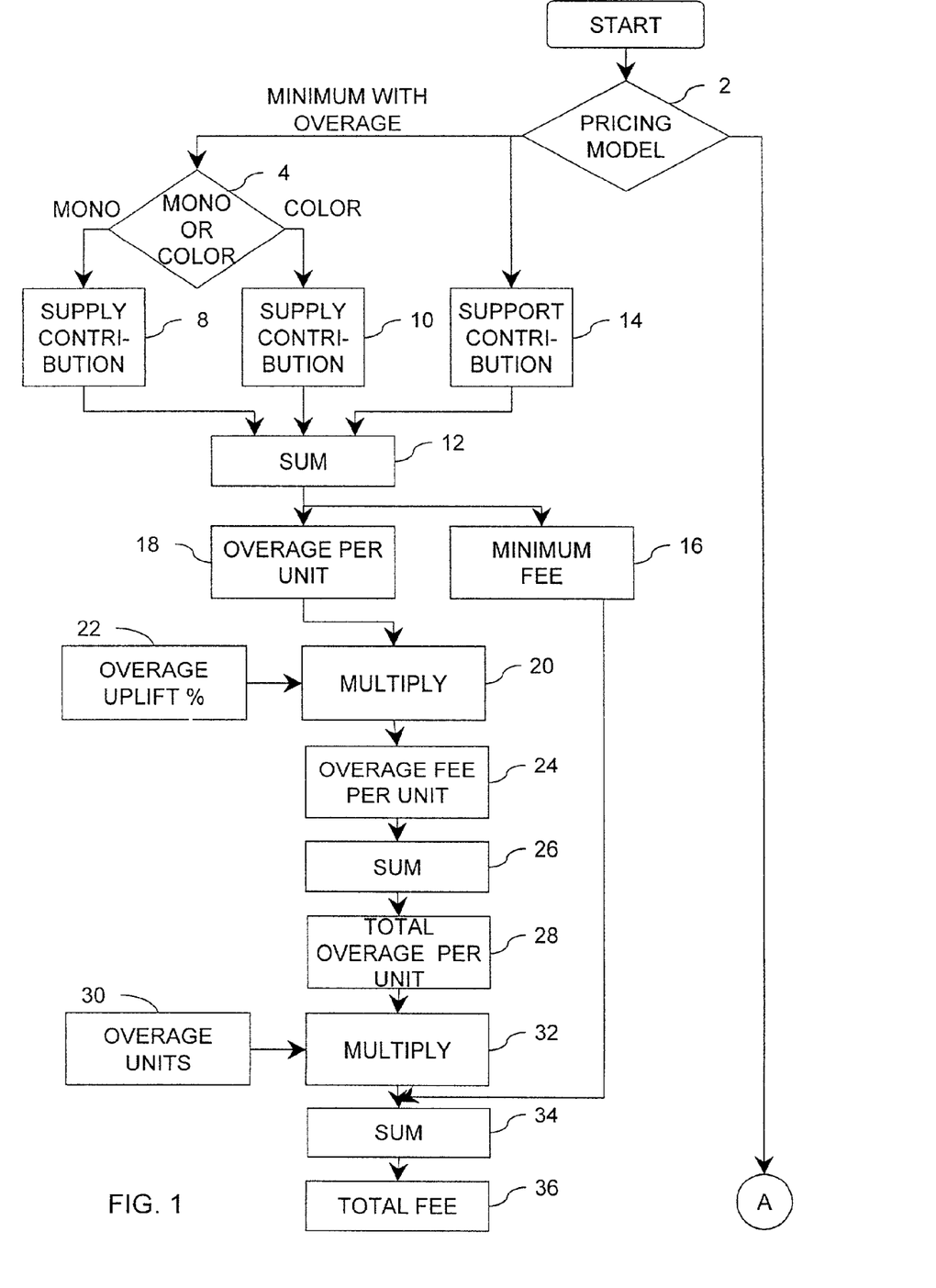
FIG. 1 is a flow diagram that depicts the entire method of the present invention, including the two first and second options.

Referring first to FIG. 1, the process of the present invention begins with a choice 2 between two possible pricing models, i.e. the minimum with overage or the fixed periodic payment. Each option of the basic pricing model contains a sub option 4 and 6 selecting the class of printer types, such as either monochromatic ("mono") printers or color printers.

Explaining first the minimum with overage option, it is seen that supply contributions 8 and 10 are determined for each of the mono and color printer installations respectively. Price contribution from supplies relates primarily to toner usage, a variable cost that relates directly to the number of pages printed and the page coverage. If the printer is monochromatic, the mono supply contribution 8 is applied to further processing. If the printer is color, the color supply contribution 10 is applied. Whichever one of the supply contributions is applied, it is added (12) to a contribution 14 from the costs relative to support. Price contribution from support activities relates primarily to preventative maintenance activities and warranty cost, also a variable that is directly related to usage of the printer units. Preventative maintenance includes the cost of kits that are supplied with a printer, the contents of which are applied to the printer as replacement parts after a given number of pages have been printed. Preventative maintenance may also include repair costs but such a factor is not necessarily related to the number of pages printed and cannot be accurately predicted on the basis of printer usage and accordingly, is not a significant element in the process of the present invention.

Figure 1A:
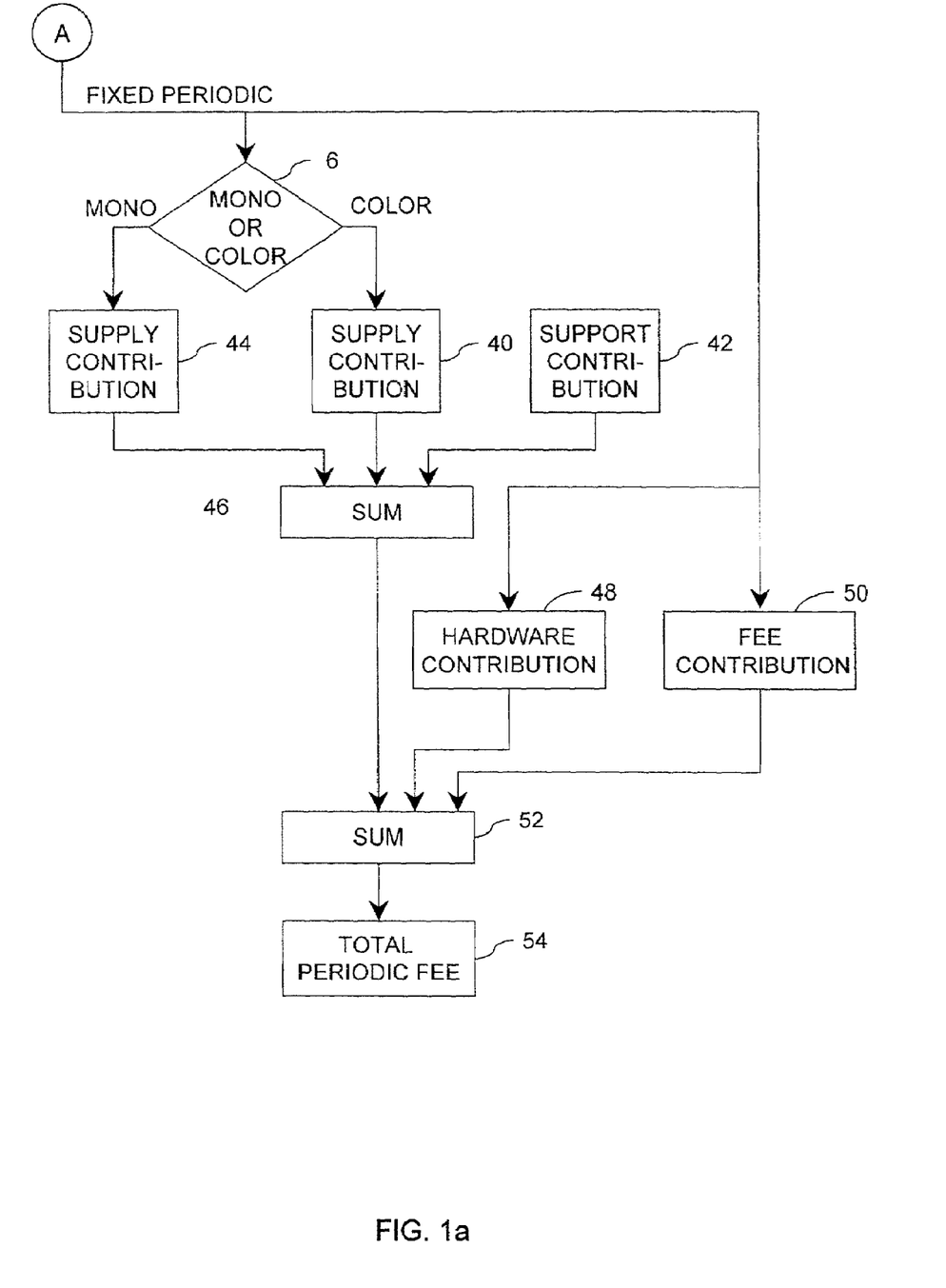
FIG. 1a is a continuation of FIG. 1.

From the sum 12 of the supply and support contributions an overage per unit is determined. In addition, the sum of the supply and support contributions are used in the determination of a basic fee 16 for a minimum number of printed pages per a given unit of time. The overage per unit 18 is multiplied (20) by an overage uplift percentage 22 to determine the overage fee per unit 24 The overage fee per unit 24 is added (26) to the actual overage per unit cost 18 to determine the total overage cost per unit 28. The actual number of overage units 30 are multiplied (32) by the total overage per unit 28 and the product is added (34) to the minimum fee 16 to arrive at the total fee 36.

The option of fixed periodic payments is developed in the process of the invention by first selecting (6) between monochromatic and color printers. As with the minimum with overage pricing model, each of these choices will dictate a distinct contribution of cost from the supply, or toner, component 40 and 42 respectively. The derivation of these contributions will be explained subsequently. A support contribution 42 (similar to the support contribution 14) is added (46) to whichever one of the supply contribution elements is selected.

For the fixed periodic pricing model the cost of the hardware becomes a component of the total fee. The hardware contribution 48 will be subsequently enlarged upon. A service fee contribution 50 is added (52) to the hardware contribution 48 and the sum 46 of the supply and support contributions to arrive at a total periodic fee 54.

Figure 2:
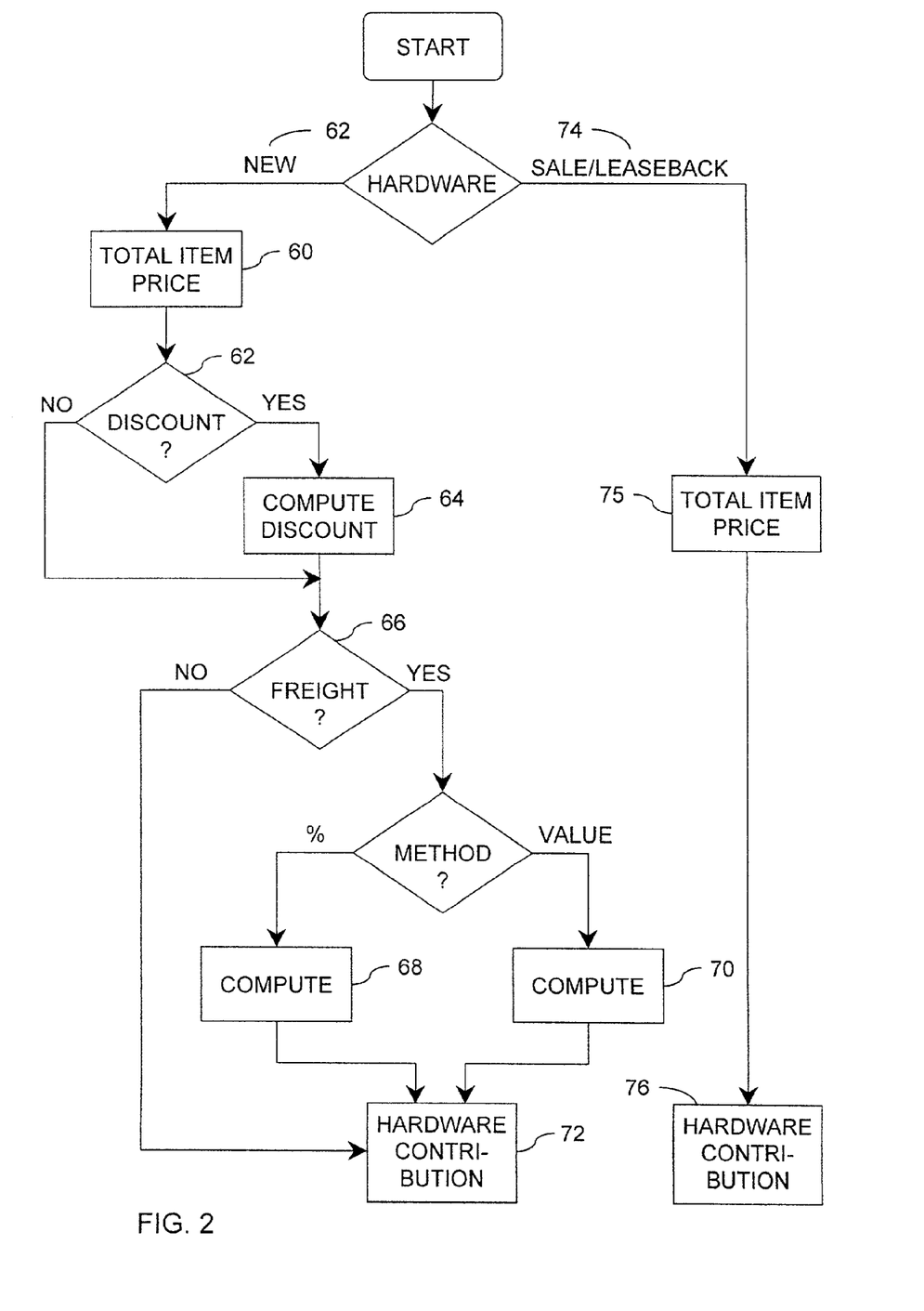
FIG. 2 is a flow diagram depicting one method for deriving the hardware contribution to the periodic fee option calculation.

In the context of the present invention, hardware is defined to include computer printers, components, accessories, necessary software and related physical items that are supplied to the user under the managed print services contract. For the fixed periodic pricing model, the cost of the hardware is a component of the final pricing and is introduced into the pricing method as the "hardware contribution" (See FIG. 2) The following steps should be applied to each unit of new hardware. To obtain the total item price 60 for each item in the fleet, add the unit price of the accessories to the unit price of the printer. Multiply this amount by the quantity. Total Item Price (TP)=(Printer Price+Accessory1 Price+Accessory2 Price+ . . . )*Quantity For example:

| HP Laser Jet 4050 | $ 1,099.00 |
| 2Gb disk-drive | $ 540.00 |
| 500-sheet feeder | $ 243.46 |
| | $ 1,882.46 |

-continued

Quantity = 8
Total Item Price (TP) = $15, 059.68

If price discounts apply (62), they may be computed (64) by any of a number of traditional means.

If freight is not included in the hardware supplier's original pricing, it is added (66) to the cost of the hardware. The freight charge is made either as a percentage 68 of the discounted hardware costs or as a fixed monetary value (70) for the entire fleet. With either option, the result is an addition to the cost of the hardware. When specified as a percentage, the freight charge is simply the total net price of the hardware item multiplied by the percentage value. If the freight has been entered as a single monetary value for the entire fleet, the cost needs to be allocated across the fleet of new items. Allocating a portion of the freight charge to each unit according to the unit's price does this. It is assumed that more expensive units have a higher freight cost than cheaper units.

Following the freight computations, if any, the hardware contribution 72 is determined by first applying the appropriate finance rate for the item according to the unit type, payment period and payment in advance or arrears. This will result in a specified finance rate. Multiply the net price to the customer by the rate to get contribution to the periodic fee for this new hardware item.

For example:
Net Price to Customer=$11,005.63
Finance Rate=0.0301% (Monthly billing, Payment in advance, 36 months, U.S.)

$$\text{Contribution to Periodic Fee} = 11,005.63 * .0301$$
$$= \$331.27 \text{ per month}$$

This payment 72 is carried forward to the summary calculation.

For the hardware category known as sale/leaseback 74 the following steps are applied to each item of sale/leaseback hardware (75). For each item in the fleet, add the sale/leaseback price of the accessories to the sale/leaseback price of the printer. Multiply this amount by the quantity. Total Item Price (TP)=(SL Printer Price+SL Accessory1 Price+. . . )*Quantity For the hardware contribution 76, apply the appropriate intangibles finance rate for the item according to the payment period and payment in advance or arrears. Multiply the net price to the customer by the rate to determine contribution to the periodic fee for the sale/leaseback hardware item. Hardware contribution to periodic fee=TP*intangibles finance rate For example:
Total Item Price=$4,400
Finance Rate=0.0324% (intangibles category, Monthly billing, Payment in advance, 36 months, U.S.)

$$\text{Contribution to Periodic Fee} = 4,400 * .0324$$
$$= \$142.56 \text{ per month}$$

This payment is carried forward to the summary calculation.

In actual practice, the derivation of the support contribution may be divided into four separate parts: break/fix pricing, preventative maintenance, installation and equipment moves. The result of each part is a contribution towards the periodic fee and a contribution to the overage. For purposes of the present invention however, the only element that will be addressed as part of the inventive method will be the variable cost that relates to page production, preventative maintenance.

Figure 3:
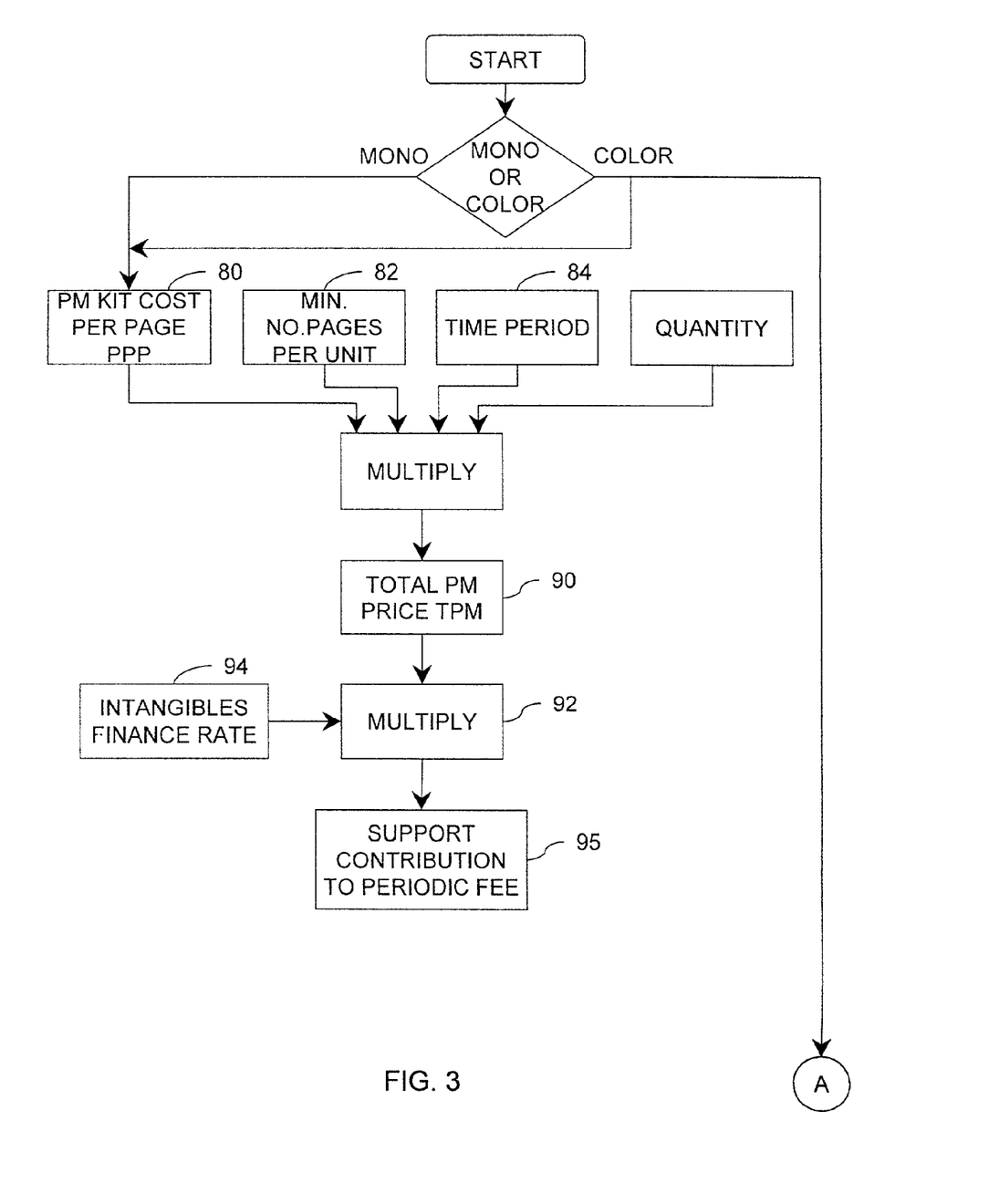
FIG. 3 is a flow diagram depicting one method of deriving the support contribution to the periodic fee option calculation and the overage option calculation.

The preventative maintenance component (PM) of the support contribution is different for each of the two pricing models, as illustrated in FIG. 3. Referring first to the contribution for the fixed periodic model, the cost per page is first determined. The PM price for both mono and color is the total cost of preventative maintenance based on the printing usage indicated by the page minimums established for each unit: Total PM Price (TPM) (90)=PM Cost Per Page (80)*(Minimum No. Pages Per Unit (82)*Term (time period 84)* Quantity (86)).

For example:
LJ 8550 (Color Printer)
Minimum No. pages per unit=3,000 per month per unit
Quantity=10
Term=36 months
PM kit cost per page=0.07372

$$\text{Total PM price} = 0.07372 * (3,000 * 36 * 10)$$
$$= \$79,617.60$$

The contribution to the periodic fee 95 is calculated by multiplying (92) the total PM price 90 by the appropriate intangibles finance rate 94 (according to quarterly/monthly billing, payment advance/arrears, contract term).

For example:
Total PM Price=$79,617.60
Finance Rate=0.0335% (Intangibles category, Monthly billing, Payment is advance, 39 months, U.S.)

$$\text{Contribution to Periodic Fee} = 79,617.60 * .0335$$
$$= \$2,667.19 \text{ per month}$$

This payment is carried forward to the summary calculation.

Figure 3A:
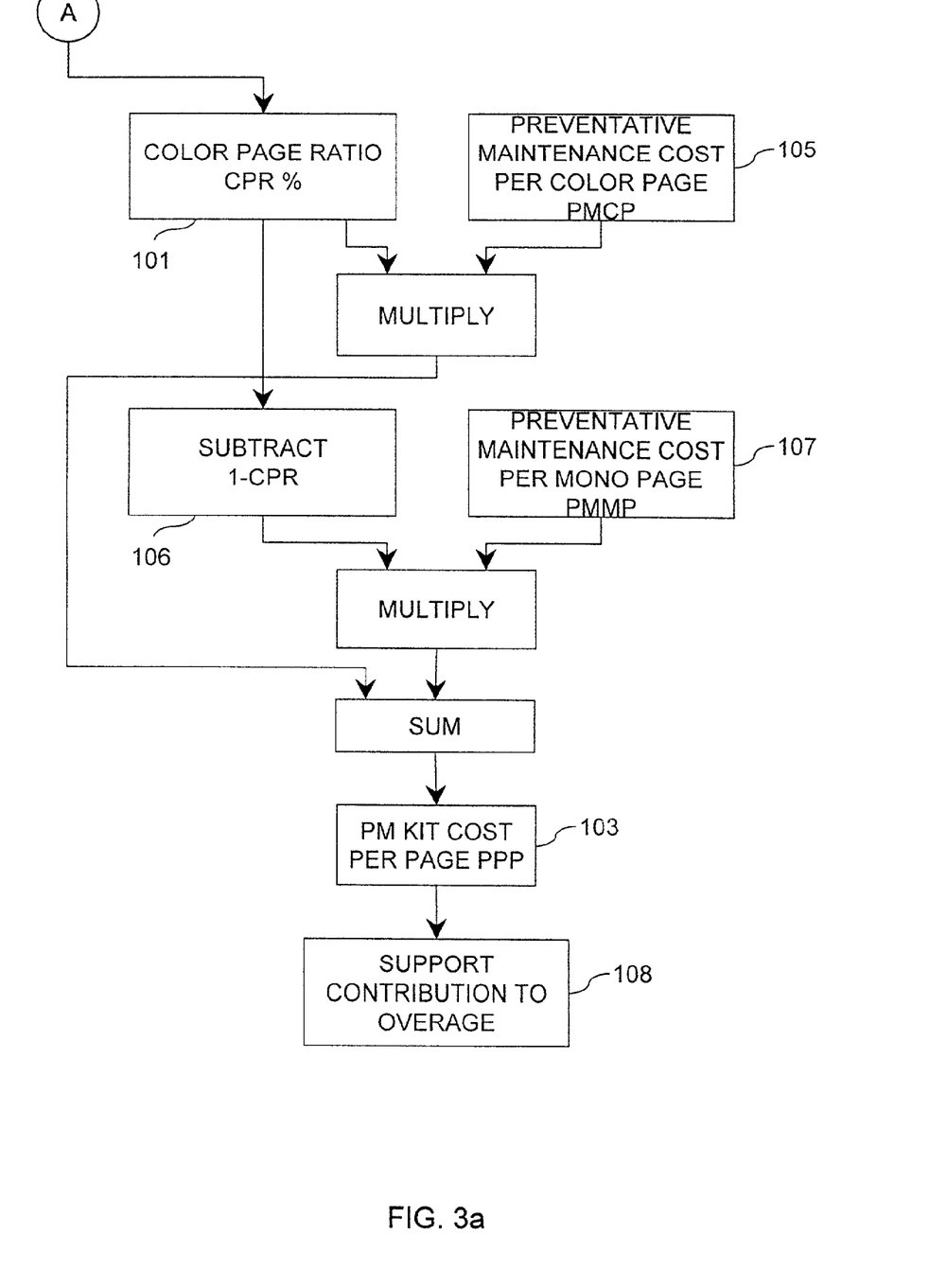
FIG. 3a is a continuation of FIG. 3.

For color devices, an additional fee is computed to account for the necessary preventative maintenance kit that is furnished to fleet users. For this calculation an average of overall cost per page based on the ratio of color pages printed versus monochrome must first be determined. The color page ratio is the percentage of color pages printed versus monochrome pages, e.g. 70%. The PM kit cost per page (PPP) (103)=(Color Page Ratio % (101)*Color PM Cost Per Page)(105)+((1−% Color Page Ratio %)(106) *Mono PM Cost Per Page(107)) For monochrome devices, 0% of pages are color and the color PM cost per page is $0.00.

For example:
LJ 8550 (color printer)
Color Page Ratio=70% color pages
Color PM Cost Per Page=0.0961
Mono PM Cost Per Page=0.0215

$$\text{PM Kit Cost Per Page} = (.7 * 0.0961) + ((1 - .7) * 0.0215)$$
$$= 0.0737$$

For pages printed beyond the minimums established for each device, the PM kit cost per page will be forwarded as a contribution 108 to the overage for each unit in each item. Contribution to Overage (108)=PM Kit Cost Per Page (103) (for each unit in the Fleet)

Figure 4:
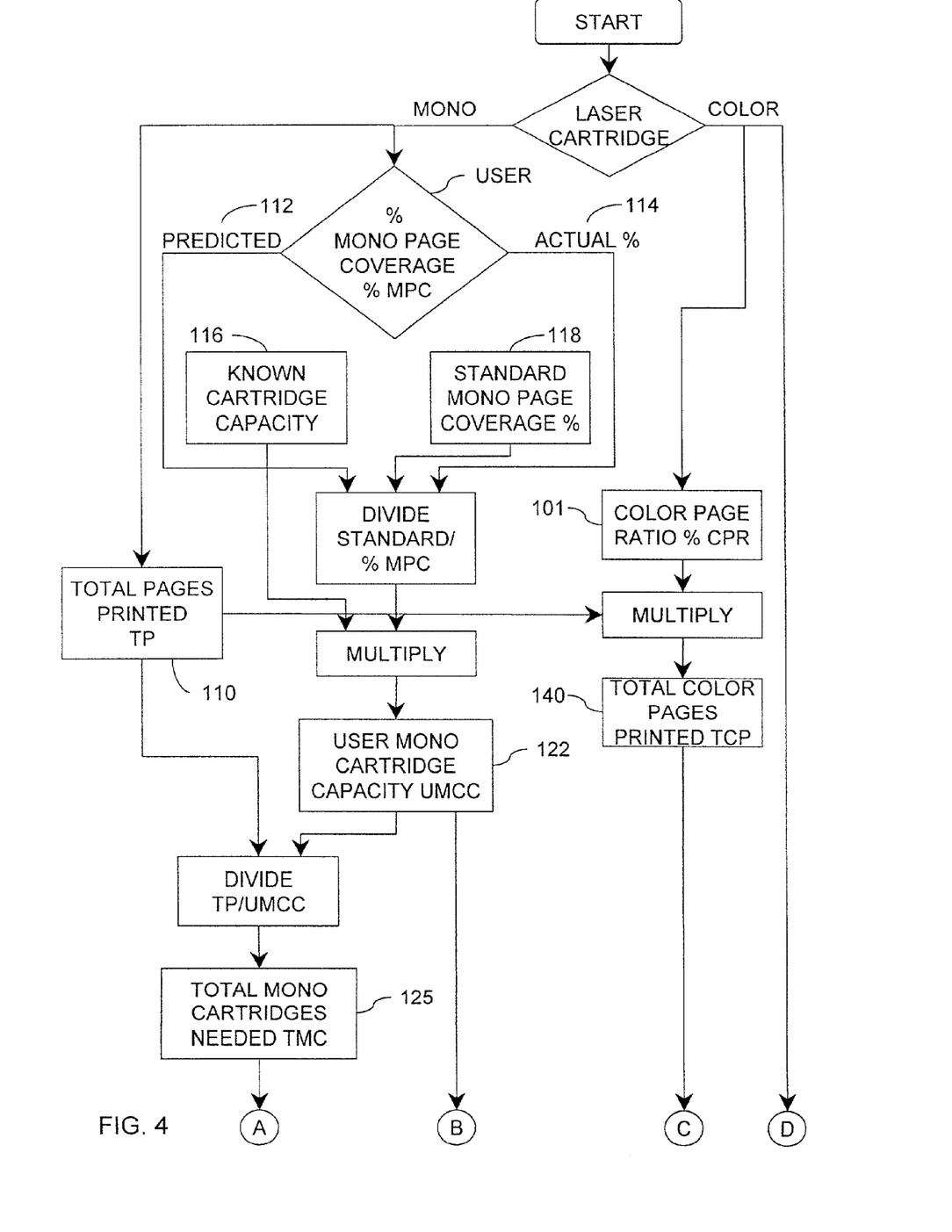
FIG. 4 is a flow diagram depicting the derivation of the supplies contribution to the periodic fee option calculation and the overage option calculation.

The supplies contribution calculation is focused on the amount of toner that will be used throughout the contract term. This calculation is different for monochrome and color printers. In both cases, the result is a contribution to the customers' periodic fee, and a contribution to the overage.

For each monochrome printer item in the fleet the total number of pages projected to be printed over the time period of the contract is determined. Total Pages Printed (TP) (110)=Pages Per Month*Contract Term*Quantity For example:
Pages per Month=5,000
Term=36 months
Quantity=30

$$\text{Total Pages Printed} = 5,000 * 36 * 30$$
$$= 5,400,000 \text{ pages}$$

Figure 5:
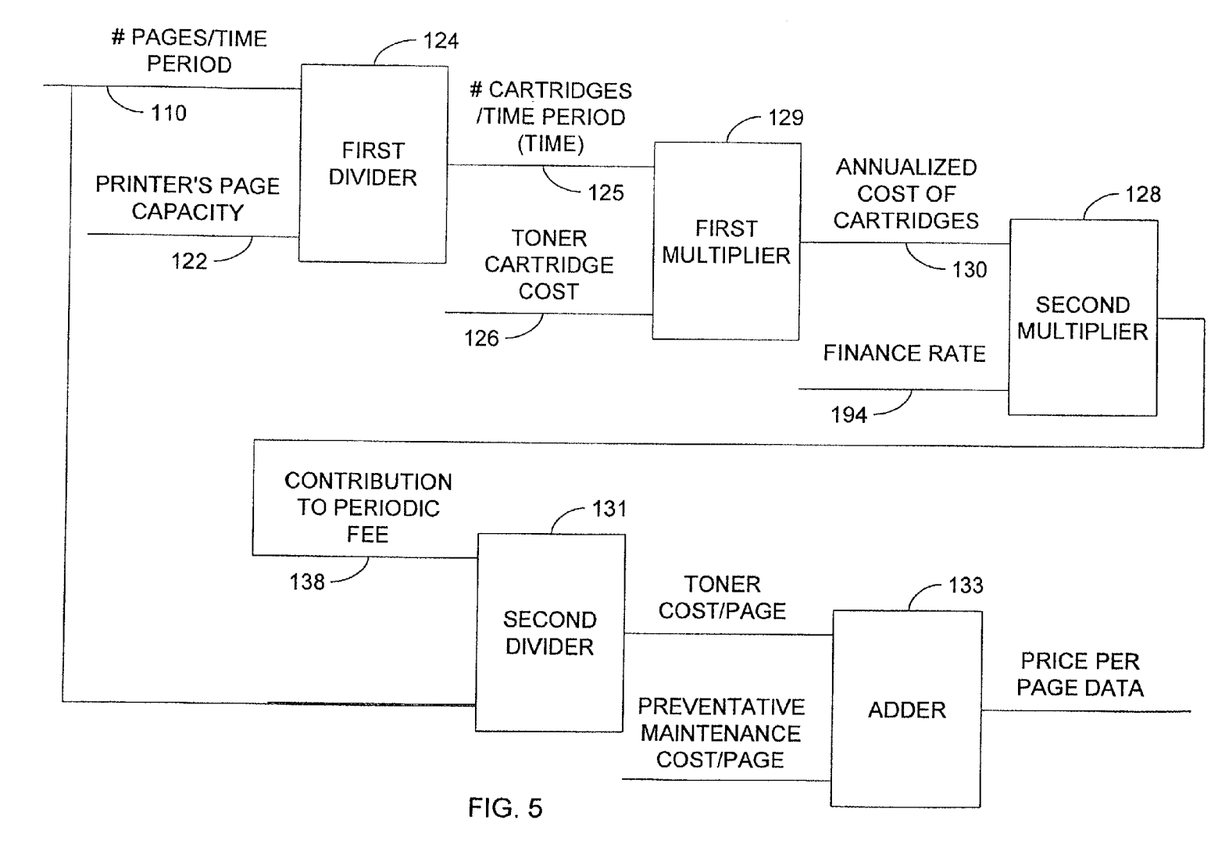
FIG. 5 is a block diagram of electronic apparatus for implementing the process of the present invention.

Referring now to FIGS. 4 and 5, the next step is to calculate the average number of pages the customer will realize out of each toner cartridge, based on the page coverage that has been predicted for them 112. A typical estimate for cartridge capacities is 5% page coverage. Rather than estimate the percentage of page coverage, the coverage can be measured (114) for a more accurate result. Such measurement would require apparatus installed on each printer that would analyze the extent of toner coverage on each page. One method for accomplishing this type of measurement would employ a scanner to count the pixels of toner deposited on the page as a ratio of the number of pixels necessary to cover the entire page. User (or printer) Mono Cartridge Capacity (UMCC) (122)=Known Cartridge Capacity at 5% (116)*(5% (118))/Mono Page Coverage % (112))

For example:
Cartridge Capacity (116)=10,000 pages @ 5% coverage
Predicted (112) or Actual (114) Customer Page Coverage=7%

$$\text{Customer Cartridge Capacity} = 10,000 * (0.05/0.07)$$
$$= 7,143 \text{ pages}$$

Next, the total number of cartridges required for the device over the term of the contract (125) is calculated.

Total Mono Cartridges Needed (TMC) (125)=TP (110)/UMCC (122)

For example:
Total Pages Printed=5,400,00 pages
Customer Cartridge Capacity=7,143 pages $$\text{Total Cartridges Needed} = 5{,}400{,}00/7{,}143$$
$$= 755.98 \text{ or } 756 \text{ cartridges}$$

With respect to the apparatus shown in FIG. 5, the division of total pages printed in a given time period 110 by the cartridge capacity 122 is implemented by an electronic divider 124, producing a voltage signal representative of the number of cartridges needed for the given time period.

Toner is different from other costs in that it is priced on an annual basis. We now calculate the cost of 12 months worth of toner for each item. Annualized Mono Toner Cost (MATC) (130)=TMC (125)*Toner Cartridge Cost (126)/ Contract Term) (127)*12

For example:
Total Mono Cartridges Needed=756
Toner Cartridge Cost=$95.88
Contract Term=36 months $$\text{Annualized Toner Cost} = ((755.98 * 95.88)/36) * 12$$
$$= \$24{,}161.12$$

In the FIG. 5 illustration of apparatus the multiplication of cartridges per time period and the toner cartridge cost is carried out in electronic multiplier 129.

The contribution to the periodic fee 138 is calculated by multiplying the annualized toner cost 130 by an appropriate toner finance rate 134 in a multiplier 128 according to quarterly/monthly billing, payment advance/arrears, contract term). Contribution to Periodic Fee 138=Annualized Toner Cost 130\*Toner Finance Rate 134.

For example:
Annualized Toner Cost=$24,161.12
Toner Finance Rate=0.0891 (toner/monthly/payment in advance/48 months)

$$\text{Contribution to Periodic Fee} = 24{,}161.12 * 0.0891$$
$$= \$2{,}152.76 \text{ per month}$$

For sake of simplicity the apparatus model of FIG. 5 assumes a one-year contract period, thus eliminating the need to show the division by the number of months of the contract. The contribution to the periodic fee 138 can be further extrapolated by dividing that figure by the number of pages processed in the same period of time in a second divider 131 to arrive at the toner cost per page. In adder 133 the value representing the toner cost per page is added to the value representing the preventative maintenance cost per page to compute the total price per page.

For each page printed beyond the minimum established for each unit in each item, there is also a contribution to the overage fee to cover the cost of toner: Contribution to Overage 140=Toner Cartridge Cost 126/User Mono Cartridge Capacity 122.

For example:
Toner Cartridge Cost=$95.88
Customer Cartridge Capacity=7,143 pages $$\text{Contribution to Coverage} = 95.88/7{,}143$$
$$= \$0.0134 \text{ per page}$$

Figure 4A:
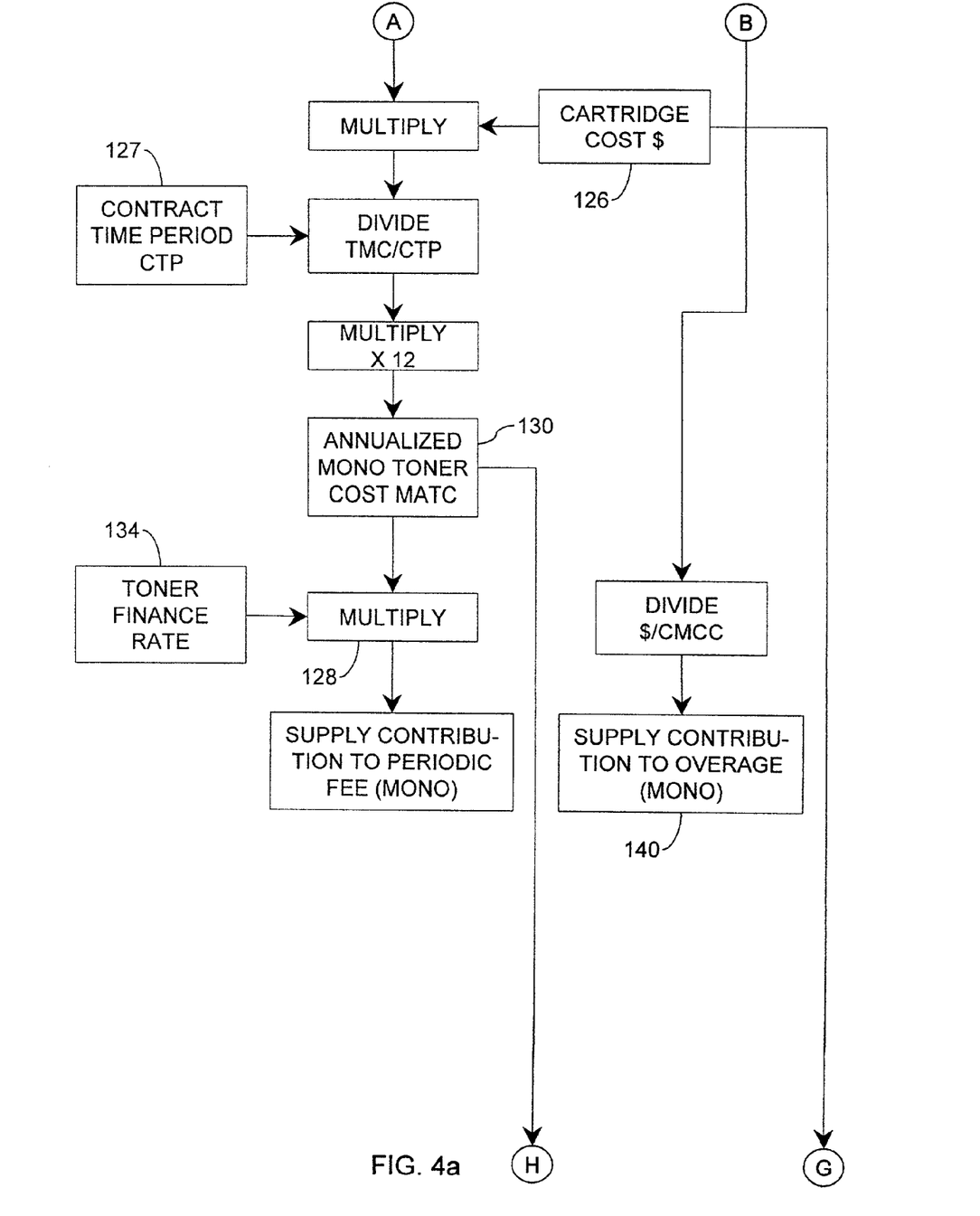
FIG. 4a is a continuation of FIG. 4.

For color printers, it is necessary to calculate the total pages printed and the color pages printed. For each item in the fleet the total number of pages that will be printed over the term of the contract is calculated: Total Pages Printed (TP) (110)=Pages Per Month Per Unit*Quantity*Contract Term. Now calculate the number of color pages that will be printed using the color page ratio 101 already specified. It is assumed that every page will contain black regardless of whether the page contains color elements. Total Color Pages Printed (TCP) (140)=TP (110)*Color Page Ratio % (101).

For example:
Total Pages Printed=1,080,000 pages
Color Page Ratio=70%

$$\text{Total Color Pages Printed} = 1{,}080{,}00 * 0.7$$
$$= 756{,}000 \text{ color pages}$$

Figure 4B:
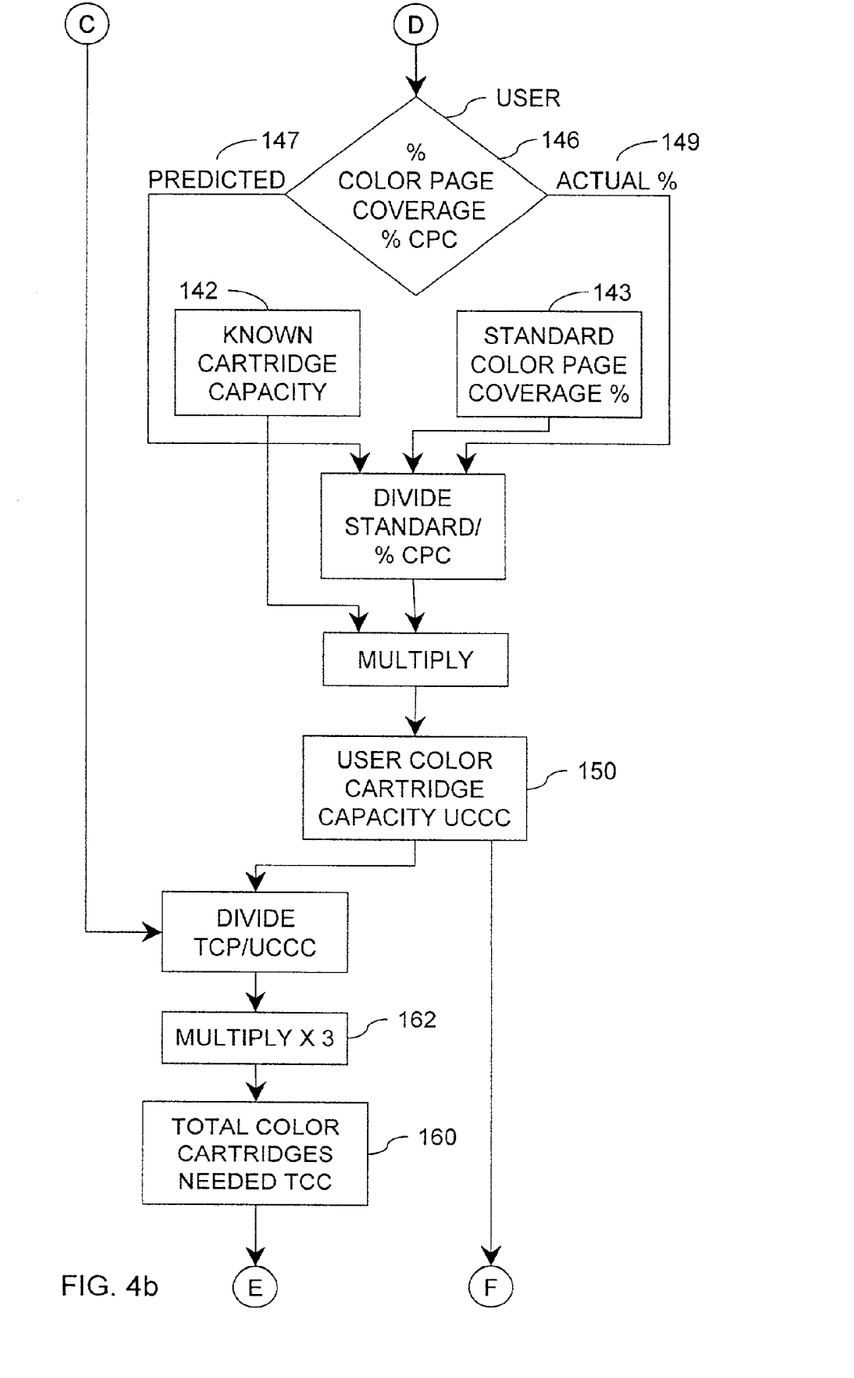
FIG. 4b is a continuation of FIG. 4

The next step is to calculate the average number of pages the customer will realize out of each toner cartridge based on the page coverage estimates. This is applied to both the monochrome and color cartridges required by a color device. Again, the typical estimate is 5% page coverage. User Color Cartridge Capacity (UCCC) (150)=Color Cartridge Capacity at 5% (142)*(5% (143)/User Color Page Coverage % (146)). As with the mono printers, the user color page coverage can be predicted (147) or, for better accuracy, can be measured as actual historical coverage (149).

For example:
Color Cartridge Capacity=6,000 pages @ 5% coverage
Customer Color Page Coverage=15%

$$\text{Customer Color Cartridges Capacity} = 6{,}000 * (0.05/0.15)$$
$$= 2{,}000 \text{ pages}$$

The next calculation is that of determining the total number of mono and color cartridges required for the device over the term of the contract. The total mono cartridges needed (TMC) (125) has already been determined. The total color cartridges needed (TCC) (160)=(TCP (140)/UCCC) (150)\*3 (162). The multiple of three is required because a color laser printer has three color cartridges (cyan, magenta and yellow)

For example:
Total Pages Printed=1,080,000 pages
Customer Mono Cartridge Capacity=9,000 pages $$\text{Total Mono Cartridges Needed} = 1{,}080{,}000/9{,}000$$
$$= 120 \text{ cartridges}$$

Total Color Pages Printed=756,000 pages
Customer Color Cartridge Capacity=2,000 pages $$\text{Total Color Cartridges Needed} = (756,000/2,00)*3$$

$$= 1134 \text{ cartridges}$$

Figure 4C:
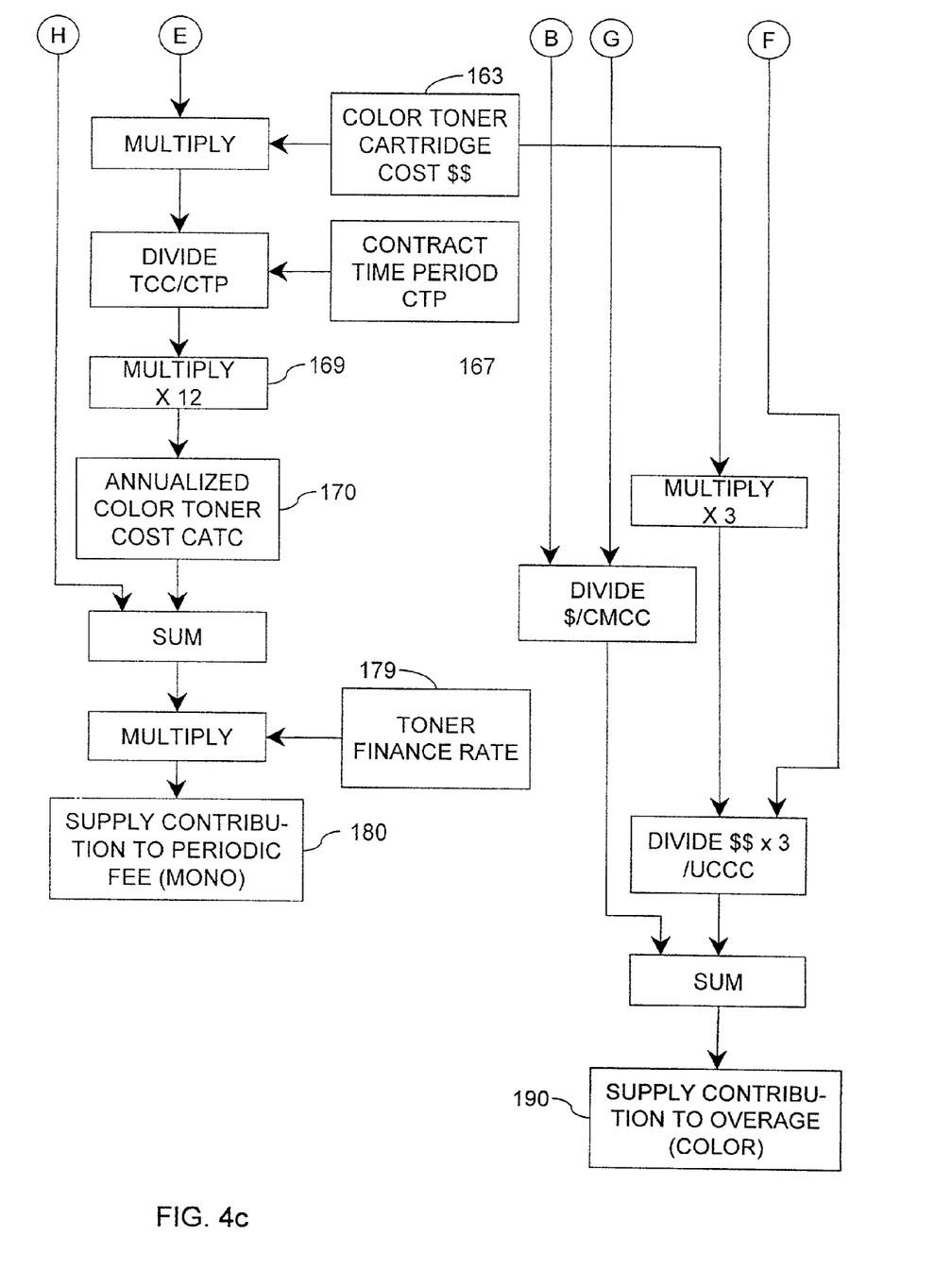
FIG. 4c is a continuation of FIG. 4.

As before, for mono cartridges, the color toner is different from other costs in that it is priced on an annual basis. We now calculate the cost of 12 months worth of color toner for each item in the fleet. Annualized. Color Toner Cost (CATC) (170)=((TCC (160)*Color Toner Cartridge Cost (163))/Term (167))*12 (169). It is assumed that the cost of each of the three color cartridges are the same.
For example:
Total Color Cartridges Needed=1,134
Color Toner Cartridge Cost=$97.44
Contract Term=36 months $$\text{Annualized Color Toner Cost} = ((1134*97.44)/36)*12$$

$$= \$36,832 \text{ per year}$$

The contribution to the periodic fee is calculated by multiplying the annualized toner cost by an appropriate toner finance rate (according to quarterly/monthly billing, payment advance/arrears, contract term). Contribution to Periodic Fee (180)=(MATC (130)+CATC (170))*Toner Finance Rate (179).
For example:
Annualized Mono Toner Cost=$3,118
Annualized Color Toner Cost=$36,832
Toner Finance Rate=0.0891 (toner/monthly/payment in advance/48 months)

$$\text{Contribution to Peridoic Fee} = (3118 + 36832)*0.0891$$

$$= \$3,559.55 \text{ per month}$$

For each page printed beyond the minimum established for each unit in each item, there is also a contribution to the overage fee to cover the cost of toner: Contribution to Overage (190)=(Mono Toner Cartridge Cost (126)/CMCC (122))+((Color Toner Cartridge Cost (163)*3)/UCCC (150)).
For example:
Mono Toner Cartridge Cost=$77.95
Color Toner Cartridge Cost=$97.44
Customer Mono Cartridge Capacity=9,000 pages
Customer Color Cartridge Capacity=2,000 pages $$\text{Contribution to Overage} = (77.95/9,000) + ((97.44*3)/2,000)$$

$$= .00866 + 0.146$$

$$= \$0.157 \text{ per page}$$

A service fee is another component of the periodic fee. The service fee can be computed on any number of basis and have a selected array of sub-components. Because the best mode of the method of the present invention does not base the service fee on a pay-per-page model, it is sufficient to say that a service fee, however calculated, is added as a contribution to the periodic fee.

For calculating the total periodic fee for each item of new and sale/leaseback equipment, add the following contributions to get the total periodic fee for that item: Total Periodic Fee Per Item=Hardware Periodic Fee+Support Periodic Fee+Supplies Periodic Fee+Service Fee.
For example:
LJ 4050 Printer
Hardware Periodic Fee=$1,293.34
Support Periodic Fee=$910.53
Supplies Periodic Fee=$1,537.72
Service Fee=$2,101.00

$$\text{Total Periodic Fee Per Item} = 1293.34 + 910.53 + 1537.72 + 2101.00$$

$$= \$5,751.59$$

Add the total periodic fee for each item to get the total periodic fee for the entire fleet.
The total overage fee is specified as a per page cost for a single unit of a particular item. The overage cost per unit is the summation of the two contributions to the overage charge: Overage Per Unit=Toner Overage+PM Kit Overage
For example:
LJ 4050 Printer
Toner Overage=0.0096 per page
PM Kit Overage=0.0018 per page $$\text{Overage Per Unit} = 0.0096 + 0.0018$$

$$= 0.0114$$

The service fee can include an uplift on the overage per unit. This is specified as a percentage increase on the overage per unit charge.

$$\text{Service Overage Fee Per Unit} = \text{Overage Uplift} \%*\text{Overage Per Unit}$$

For example:
LJ 4050 Printer
Overage per unit=0.0114
Overage Uplift=15%

$$\text{Overage Fee} = 0.0114*.15$$

$$= 0.0017$$

The total overage charge per unit is the overage per unit added to the service overage fee:

$$\text{Total Overage Per Unit} = \text{Overage Per Unit} + \text{Service Overage Fee Per Unit.}$$

For example:
LJ 4050 Printer
Overage Fee Per Unit=0.0114
DWS Overage Fee Per Unit=0.0017

$$\text{Total Overage Per Unit} = 0.0114 + 0.0017$$

$$= \$0.0131 \text{ per page}$$

What is claimed is:

1. A computer implemented method for generating a price quote for a customer for a printer, having a toner carrying cartridge, within a managed print services group, the method comprising the steps of:
   (a) calculating a first contribution to the per page pricing data by:
      (1) determining a total number of pages that will be processed over a given time period,
      (2) determining a user's page capacity for a single toner cartridge,
      (3) calculating a total number of required toner cartridges for the given time period by dividing the determined total number of processed pages by the user's page capacity for a single toner cartridge,
      (4) determining a given time period total toner cost,
      (5) multiplying the given time period total toner cost by a selected toner finance rate for obtaining a discounted toner cost for the given time period,
      (6) dividing the total number of pages that will be processed over a given time period by the discounted toner cost for the given time period,
   (b) calculating a second contribution to the per page pricing data by determining a preventative maintenance cost per processed page for the printer,
   (c) summing the first and second contributions to the per page pricing data, and
   (d) generating a price quote from the per page pricing data.

2. The method of claim 1 where determining the user's page capacity for a single toner cartridge comprises multiplying the page capacity of a toner cartridge by a quotient of a standard page coverage percentage divided by a users estimated page coverage percentage.

3. The method of claim 2 where the step of determining the user's page capacity for a single toner cartridge comprises, determining the user's page capacity for a single mono toner cartridge by multiplying the page capacity of a mono toner cartridge by the quotient of a standard mono page coverage percentage divided by a user's estimated mono page coverage percentage.

4. The method of claim 2 where the total number of pages that will be processed over the time period includes a number of mono pages and a number of color pages.

5. The method of claim 4 and further including calculating a color page ratio by dividing the number of color pages by the total number of pages that will be processed over the time period.

6. The method of claim 5 where the step of determining a user's color page capacity for a single color toner cartridge comprises, multiplying a color page capacity of a color toner cartridge by a quotient of a standard color page coverage percentage divided by a user's estimated color page coverage percentage.

7. The method of claim 6 further including determining an annualized toner cost by multiplying the number of mono and color cartridges by the mono and color cartridge cost respectively and multiplying each product by a quotient of twelve divided by the time period in months.

8. The method of claim 7 and further including,
   (a) establishing a minimum number of pages to each be priced at the sum of the first and second contributions to the per page pricing data, and
   (b) calculating a third contribution to the per page pricing data for all pages in excess of an established minimum number of pages by adding the quotient of the mono toner cartridge cost divided by the user's page capacity for a single mono toner cartridge to the quotient of the product of a color toner cartridge cost multiplied by three, divided by the user's page capacity for a single color toner cartridge.

9. The method of claim 1 where the determination of the total number of pages that will be processed over the time period is an estimate.

10. The method of claim 1 where the determination of the total number of pages that will be processed over the time period is an actual number.

11. The method of claim 5 where the step of determining the user's color page capacity for a single color toner cartridge comprises multiplying the color page capacity of a color toner cartridge by the quotient of a standard color page coverage percentage divided by the user's historical average of actual color page coverage percentage.

* * * * *

UNITED STATES PATENT AND TRADEMARK OFFICE
CERTIFICATE OF CORRECTION

PATENT NO.          : 7,127,433 B2                                          Page 1 of 1
APPLICATION NO. : 09/974103
DATED                 : October 24, 2006
INVENTOR(S)        : Jonathan Baker It is certified that error appears in the above-identified patent and that said Letters Patent is hereby corrected as shown below:

In column 5, line 43, delete "is" and insert -- in --, therefor.

In column 8, line 3, delete "Coverage" and insert -- Overage --, therefor.

In column 10, line 59, after "Overage" delete "Fee".

In column 11, line 33, in Claim 2, delete "users" and insert -- user's --, therefor.

Signed and Sealed this

Twenty-third Day of June, 2009

JOHN DOLL
*Acting Director of the United States Patent and Trademark Office*